United States Patent
Raj et al.

(10) Patent No.: US 12,204,478 B2
(45) Date of Patent: Jan. 21, 2025

(54) TECHNIQUES FOR NEAR DATA ACCELERATION FOR A MULTI-CORE ARCHITECTURE

(71) Applicant: Intel Corporation, Santa Clara, CA (US)

(72) Inventors: Swapna Raj, Norwalk, CT (US); Samantika S. Sury, Westford, MA (US); Kermin Chofleming, Hudson, MA (US); Simon C. Steely, Jr., Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 17/206,961

(22) Filed: Mar. 19, 2021

(65) Prior Publication Data
US 2021/0224213 A1    Jul. 22, 2021

(51) Int. Cl.
*G06F 13/40* (2006.01)
*G06F 12/0815* (2016.01)
*G06F 13/16* (2006.01)

(52) U.S. Cl.
CPC ...... *G06F 13/4027* (2013.01); *G06F 12/0815* (2013.01); *G06F 13/1668* (2013.01); *G06F 2212/1024* (2013.01)

(58) Field of Classification Search
CPC .............. G06F 12/0815; G06F 2212/1024
See application file for complete search history.

(56) References Cited

U.S. PATENT DOCUMENTS

| | | | |
|---|---|---|---|
| 9,092,345 B2 | 7/2015 | Nystad et al. | |
| 9,250,914 B2 | 2/2016 | Hughes et al. | |
| 9,734,063 B2 | 8/2017 | Novakovic et al. | |
| 10,296,459 B1 | 5/2019 | Jayasimha et al. | |
| 11,836,102 B1* | 12/2023 | Mathuriya | G06F 13/4027 |
| 2002/0087811 A1 | 7/2002 | Khare et al. | |
| 2005/0132148 A1 | 6/2005 | Arimilli et al. | |
| 2009/0037653 A1* | 2/2009 | Brokenshire | G06F 13/28 711/E12.002 |
| 2015/0032924 A1 | 1/2015 | Saripalli | |
| 2015/0046655 A1 | 2/2015 | Nystad et al. | |
| 2016/0299860 A1* | 10/2016 | Harriman | G06F 13/4282 |
| 2016/0328322 A1 | 11/2016 | Biswas et al. | |
| 2020/0301838 A1 | 9/2020 | Sinha et al. | |

(Continued)

OTHER PUBLICATIONS

Banks, Christopher J. et al., "Verification of a lazy cache coherence protocol against a weak memory model", May 18, 2017, 10 pages.

(Continued)

*Primary Examiner* — Henry Tsai
*Assistant Examiner* — Aurangzeb Hassan
(74) *Attorney, Agent, or Firm* — Compass IP Law PC

(57) ABSTRACT

Examples include techniques for near data acceleration for a multi-core architecture. A near data processor included in a memory controller of a processor may access data maintained in a memory device coupled with the near data processor via one or more memory channels responsive to a work request to execute a kernel, an application or a loop routine using the accessed data to generate values. The near data processor provides an indication to the requestor of the work request that values have been generated.

23 Claims, 13 Drawing Sheets

(56) References Cited

U.S. PATENT DOCUMENTS

| | | | |
|---|---|---|---|
| 2021/0201986 A1* | 7/2021 | Brandl | G11C 11/40615 |
| 2022/0197656 A1* | 6/2022 | Heirman | G06F 9/3802 |
| 2022/0206869 A1* | 6/2022 | Ramachandran | G06F 3/0673 |

OTHER PUBLICATIONS

Extended European Search Report for U.S. Appl. No. 17/206,961, Mailed Jul. 14, 2022, 13 pages.
Jaehyuk Huh et al., "Coherence Decoupling: Making Use of Incoherence", ASPLOS '04, Oct. 9-13, 2004, Boston, Massachusetts, USA, 10 pages.
Jie Li et al., "PIMS: A Lightweight Processing-in-Memory Accelerator for Stencil Computations", MEMSYS '19, Sep. 30-Oct. 3, 2019, Washington, DC, USA, 12 pages.

* cited by examiner

PSEUDOCODE 300

```
//Reduction
#NDP offload
acc = 0
for(i)
    acc += a[i]
```

```
//host code
acc = 0
for ndp in NDPs
{
    acc += acc(ndp)
}
```

```
//NDP Code:
acc = 0
for (i)
        val, distance = ld_local(a[i])
        if (!distance)
        {
            acc+= a[i]
            i +=1
        }
        else
//page not in stack ;skip other addresses in page
            i += distance
```

*FIG. 3*

OPCODE TABLE 400

| Operation | Description |
|---|---|
| `Sample instruction specialized accelerator`<br>`memoryOperatorLocal`<br>`inMemoryOpArg,outMemoryOpRetvalue,outMemoryOpRetDistance` | Generic locality aware memory operator. Examples include load and store, but may include more complex operations, like arithmetic atomics, that include computation or other side-effects. Operation takes a number of input arguments and produces a number of output values. The local keyword specifies that a distance will be returned to indicate whether the data is local memory or remote memory with respect to the NDP. The programmer can use this distance value to bring locality awareness to the program, eg: skip other addresses in the page, introduce control flow in code based on knowledge of locality. |
| `Sample instruction (X86 like)`<br>`mov_local <dst> <src>`<br>`eg:`<br>`mov_local <reg> <mem>`<br>`mov_local <mem> <reg>`<br>`mov_local <mem> <const>` | Specialized mov operation to move data to/from memory. The instruction encoding will indicate that translation failures may be used to increment addresses. |

RECEIVE, AT A NEAR DATA PROCESSOR OF A MEMORY CONTROLLER OF A PROCESSOR, A WORK REQUEST TO EXECUTE A KERNEL, AN APPLICATION, OR A LOOP ROUTINE USING DATA MAINTAINED IN A MEMORY REGION OF A FIRST MEMORY DEVICE COUPLED WITH THE NEAR DATA PROCESSOR VIA AT LEAST ONE MEMORY CHANNEL
1102

ACCESS THE DATA MAINTAINED IN THE MEMORY REGION TO GENERATE VALUES RESPONSIVE TO EXECUTION OF THE KERNEL, THE APPLICATION, OR THE LOOP ROUTINE
1104

INDICATING TO A REQUESTER OF THE WORK REQUEST THAT THE VALUES HAVE BEEN GENERATED
1106

FIG. 11

*Storage Medium 1200*

*Computer Executable Instructions for 1100*

*FIG. 12*

TECHNIQUES FOR NEAR DATA ACCELERATION FOR A MULTI-CORE ARCHITECTURE

STATEMENT OF GOVERNMENT RIGHTS

This invention was made with Government support under Agreement No. HR98230A-13-D-0124, awarded by the Department of Defense. The Government has certain rights in the invention.

TECHNICAL FIELD

Examples described herein are generally related to techniques for near data acceleration for a multi-core architecture with multiple memory controllers.

BACKGROUND

In most computing systems, data movement contributes to a significant portion of system energy and performance cost when processors of these computing systems execute memory intensive applications. Many emerging application workloads related to data analytics and/or machine learning (ML) may have sparse and random accesses with low processor cache reuse. Some types of commonly used cache hierarchy techniques may reduce a cost of data movement by moving data closer to a processor or cores of a multi-core processor and retaining that data in a particular cache for subsequent reuse by the processor or cores of a multi-core processor.

BRIEF DESCRIPTION OF THE DRAWINGS

FIG. 3 illustrates an example pseudocode.
FIG. 4 illustrates an example opcode table.
FIG. 11 illustrates an example second logic flow.
FIG. 12 illustrates an example of a storage medium.

DETAILED DESCRIPTION

As contemplated by this disclosure, commonly used processor cache hierarchy techniques may move data closer to a processor or cores of a multi-processor to reduce a cost of data movement. This movement of data that causes a retaining of data in a particular cache for subsequent reuse may work well for cache friendly applications or kernels that have data access characteristics such as a high level of spatial or temporal locality. But these types of processor cache hierarchy techniques may be ineffective for types of applications or kernels having data access characteristic in which there is no significant data reuse or has a low level of spatial or temporal locality. In addition, the inefficiencies of these types of cache hierarchy techniques further worsen performance for these types of applications or kernels. For types of applications or kernels having a data access characteristic that includes a low level of spatial or temporal locality, moving at least a portion of processing nearer to data may more efficiently reduce data movement in a computing system executing these applications or kernels and improve performance of these types of applications or kernels.

Existing multi-core architectures may not be able to realize bandwidth advantages of new memory technologies such as, but not limited to, high bandwidth memory (HBM) without some improvement in efficiency of data movement. For example, if a 16 tile die (i.e., 16 core processor) is built to include two to four HBM stacks the 16 tiles may not drive enough data access requests to utilize a relatively high amount of memory bandwidth provided by the two to four HBM stacks. Similarly, a mesh interconnect for this type of 16 tile die (e.g., an on-die interconnect (ODI)) may not be able to route data access requests at a rate fast enough to utilize this relatively high amount of memory bandwidth. Additionally, respective memory controllers for each HBM stack may further degrade the rate at which data access requests may occur. For example, applications or kernels having data access requests with a low level of spatial and temporal locality may cause cores to submit data access requests to separate HBM stacks and those data access requests may be processed by multiple memory controllers. Data access requests to multiple memory controllers may add a significant amount of memory access latency when executing these types of applications or kernels.

As described in more detail below, energy efficient, near data accelerators or processors with reduced compute and caching capabilities may be able to better utilize the high memory bandwidth provided by new memory technologies such as, but not limited to, HBM. These types of energy efficient, near data accelerators or processors may be capable of overcoming at least some of the above-mentioned cache hierarchy techniques and ODI data movement inefficiencies and better utilize the increased memory bandwidth provided by new memory technologies.

Figure 1:
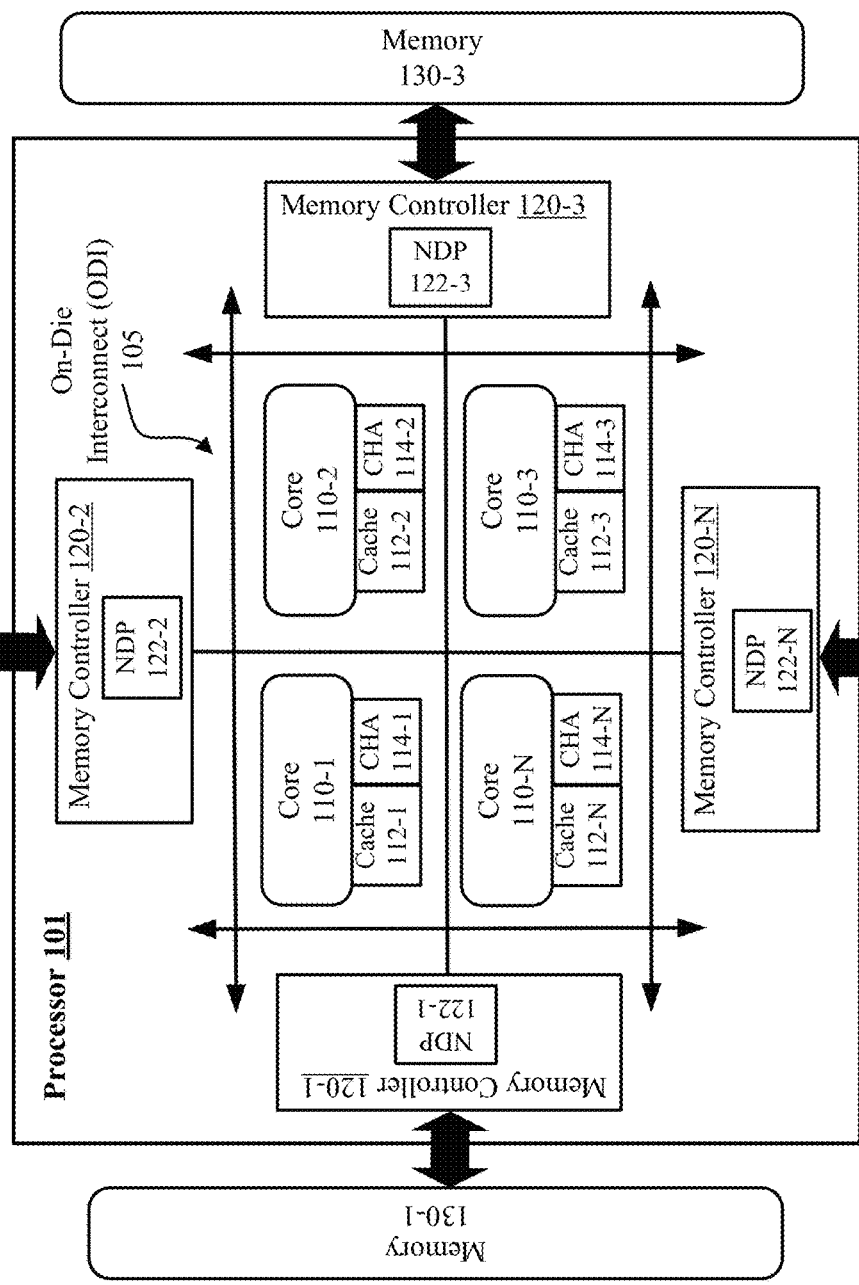
FIG. 1 illustrates an example first system.

FIG. 1 illustrates an example system 100. According to some examples, as shown in FIG. 1, system 100 includes a processor 101 coupled with memory 130-1 to 130-N via respective memory controllers 120-1 to 120-N that are communicatively coupled with cores 110-1 to 110-N via an on-die interconnect (ODI) 105. For these examples, "N" represents any whole, positive integer greater than 3. Also, for these examples, ODI 105 may couple memory controllers 120-1 to 120-N to cores 110-1 to 110-N as part of a mesh interconnect architecture that includes a 2-dimensional array of half rings going in the vertical and horizontal directions which allow communication routes between cores and memory controllers to take a shortest path. This mesh interconnect architecture may also allow for at least some elements of cores 110-1 to 110-N to couple with memory controllers 120-1 to 120-N via ODI 105. For example, cache home agents (CHAs) 114-1 to 114-N that manage cache lines (e.g., including up to 64 bytes of data) maintained in respective caches 112-1 to 112-N may be able to communicate with elements of memory controllers 120-1 to 120N via ODI 105. As described more below, memory controllers such as memory controllers 120-1 to 120-N may include near data processors (NDPs) such as NDPs 122-1 to 122-N to communicate with CHAs such as CHAs 114-1 to 114-N via ODI 105 in order to facilitate efficient near data processing. These near data processing schemes may include NDPs 122-1, 122-2, 122-3 and 122-N to directly access data maintained in respective memories 130-1, 130-2, 130-3 and 130-4. The directly accessed data, for example, to be used to execute kernels or applications having data access characteristics to a memory (e.g., memory 130-1, 130-2, 130-3 or 130-N) with a low level of spatial or temporal locality.

According to some examples, the elements of system 100 may be included on a system on a chip (SoC) or in a multi-chip package. For these examples, elements of processor 101 may be included in a first portion of an SoC or first chip of a multi-chip package. Meanwhile memory 130-1 to 130-N may be positioned in different portions of the SoC or in separate chips of a multi-chip package. For example, memory 130-1 to 130-N may be HBM types of memory separately included in respective chips of the multi-chip package.

In some examples, memory 130-1 to 130-N may include volatile types of memory whose state (and therefore the data stored in it) is indeterminate if power is interrupted. Dynamic volatile memory requires refreshing of date stored to this type of volatile memory to maintain state. One example of dynamic volatile memory incudes DRAM (Dynamic Random Access Memory), or some variant such as Synchronous DRAM (SDRAM). A memory subsystem as described herein may be compatible with a number of memory technologies described in various standards or specifications, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards or specifications are available at www.jedec.org.

According to some examples, memory 130-1 to 130-N may include at least some non-volatile types of memory whose state is determinate even if power is interrupted. These types of non-volatile memory may include block or byte-addressable, write-in-place memories. Examples may include, but are not limited to, single or multi-level Phase Change Memory (PCM) or phase change memory with a switch (PCMS), non-volatile types of memory that include chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of block or byte-addressable, write-in-place memory.

Figure 2:
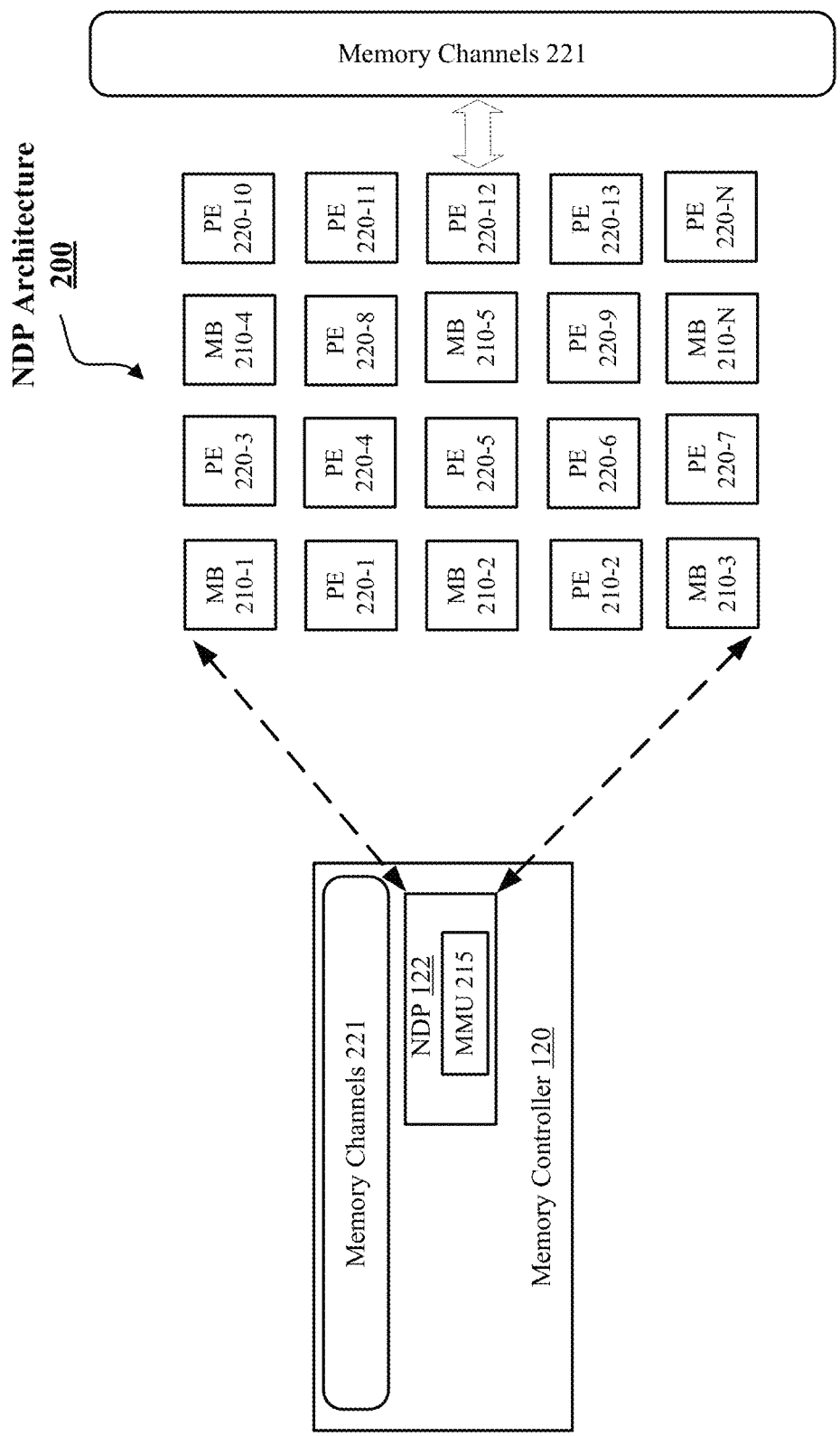
FIG. 2 illustrates an example near data processor architecture.

FIG. 2 illustrates an example near data processor architecture 200. In some examples, as shown in FIG. 2, NDP 122 included in memory controller 120 may be configured according to NDP architecture 200 that has multiple processing engines (PEs) 220-1 to 220-N and multiple memory buffers (MBs) 210-1 to 210-N to facilitate direct access to a memory (e.g., HBM) via memory channels 221. Memory channels 221 may configured to operate according to various JEDEC standards, for example, LPDDR4, LPDDR5, DDR4, DDR5, HBM, HBM2 or HBM3. As described more below, PEs 220-1 to 220-N may be processing or accelerator circuitry configured to make direct, high bandwidth, low latency requests to access data maintained in memory managed by memory controller 120. At least a portion of MBs 210-1 to 210-N may serve as request buffers or queues for access requests submitted by PEs 220-1 to 220-N to access data and/or maintain coherency with one or more cores of a processor. In some examples, MBs 210-1 to 210-N may be composed of volatile types of memory such as, but not limited to, static RAM (SRAM) or DRAM. According to some examples, NDP 122 may be capable of using data maintained in coarse grained memory regions to execute types of kernels or applications having a low level of spatial and temporal locality. A host (e.g., core of processor 110) may submit work requests to NDP 122 to execute these types of example loop or sub-routine applications. MBs 210-1 to 210-N may also be utilized by PEs 220-1 to 220-N as request or response buffers for work requests placed to NDP 122 and for results or responses by NDP 122 for those work requests.

According to some examples, NDP 122 may be configured as a matrix, vector or spatial accelerator that can drive a high amount of data bandwidth available to PEs 220-1 to 220-N. For these examples, NDP 122 may receive a request to execute memory intensive kernels, applications, or loop routines with poor cache reuse. Hence, NDP 122 does not include a cache. Rather, as shown in FIG. 2 for NDP architecture 200, NDP 122 may be configured as an array of PEs 220-1 to 220-N and MBs 210-1 to 210-N. Examples are not limited to the array structure shown in FIG. 2 for NDP architecture 200. Other examples may include an array structure having different combinations of PEs and MBs than what is shown in FIG. 2.

In some examples, a kernel, an application, or loop routine may be requested or offloaded to NDP 122 by a host (e.g., a core of processor 101). For these examples, NDP 122 may have to consider implementing memory requests to an entire virtual address space for the host. Implementing a memory request to the entire virtual address space may make it important for NDP 122 to have its own address translation mechanism. According to some examples, NDP 122 may include a memory management unit (MMU) 215 to implement this address translation mechanism. A possible address translation mechanism may include using larger page sizes and configuring MMU 215 to work with either these larger page sizes or custom ranges of the virtual address space to reduce translation lookaside buffer (TLB) misses that may negatively impact the performance of NDP 122 (TLB not shown). For example, MMU 215 may implement an address translation mechanism that utilizes a TLB to map physical memory addresses of system memory (e.g., included in memory 130-1 to 130-N) to custom ranges of the virtual address space allocated or assigned to individual cores of a processor such as processor 101.

According to some examples, a challenge of using NDP 122 to move computing closer to memory is that there may be a risk that NDP 122 may only have access to a limited portion of system memory as opposed to a type of accelerator that is on the same die (on-die) in relation to the system memory. For example, NDP 122-1 is placed on memory controller 120-1, as shown in FIG. 1. For this this example, NDP 122-1 will have direct access to memory 130-1. However, kernels or applications executed by NDP 122-1 may not be limited to data stored in only memory 130-1. In some examples, to address data partitioning between memories, in order for NDP 122-1 to be functionally complete, NDP 122-1 needs to ensure that execution of kernels or applications does not fail if: (1) data used for that execution is not local to the physical memory region directly accessible to NDP 122-1 and yet to be energy efficient, NDP 122-1 should be selected for execution of kernels or applications that minimize requests to obtain data located in non-local memory (e.g., located in memory 130-2, 130-3 or 130-N); and (2) a single instance of kernel or application execution might need data located in multiple memories (e.g., memory 130-1, memory 130-2, memory 130-3, etc.).

FIG. 3 illustrates an example pseudocode 300 and FIG. 4 illustrates an example OPCODE 400. According to some examples, pseudocode 300 indicates how an NDP such as NDP 122 may execute a type of locality aware memory instruction such as OPCODE 400 to enable NDP 122 to be functionally complete and avoid possible execution fails due to data partitioning. For these examples, physical memory may be interleaved at a cache line or page size granularity. Since NDPs such as NDP 122-1, NDP 122-2, NDP 122-3 or NDP 122-N have direct access to physical memory included in corresponding memories 130-1, 130-2, 130-3 and 130-N, depending on the interleaving scheme used, if an address translation fails all addresses within the interleaved physical memory will fail. In order to maximize energy efficiency, NDPs should avoid unnecessary memory accesses to physical memory. For these examples, OPCODE 400, when executed, serves as a type of locality aware memory instruction that may minimize unnecessary memory requests by issuing memory requests based on previous translation failure.

Figure 5:
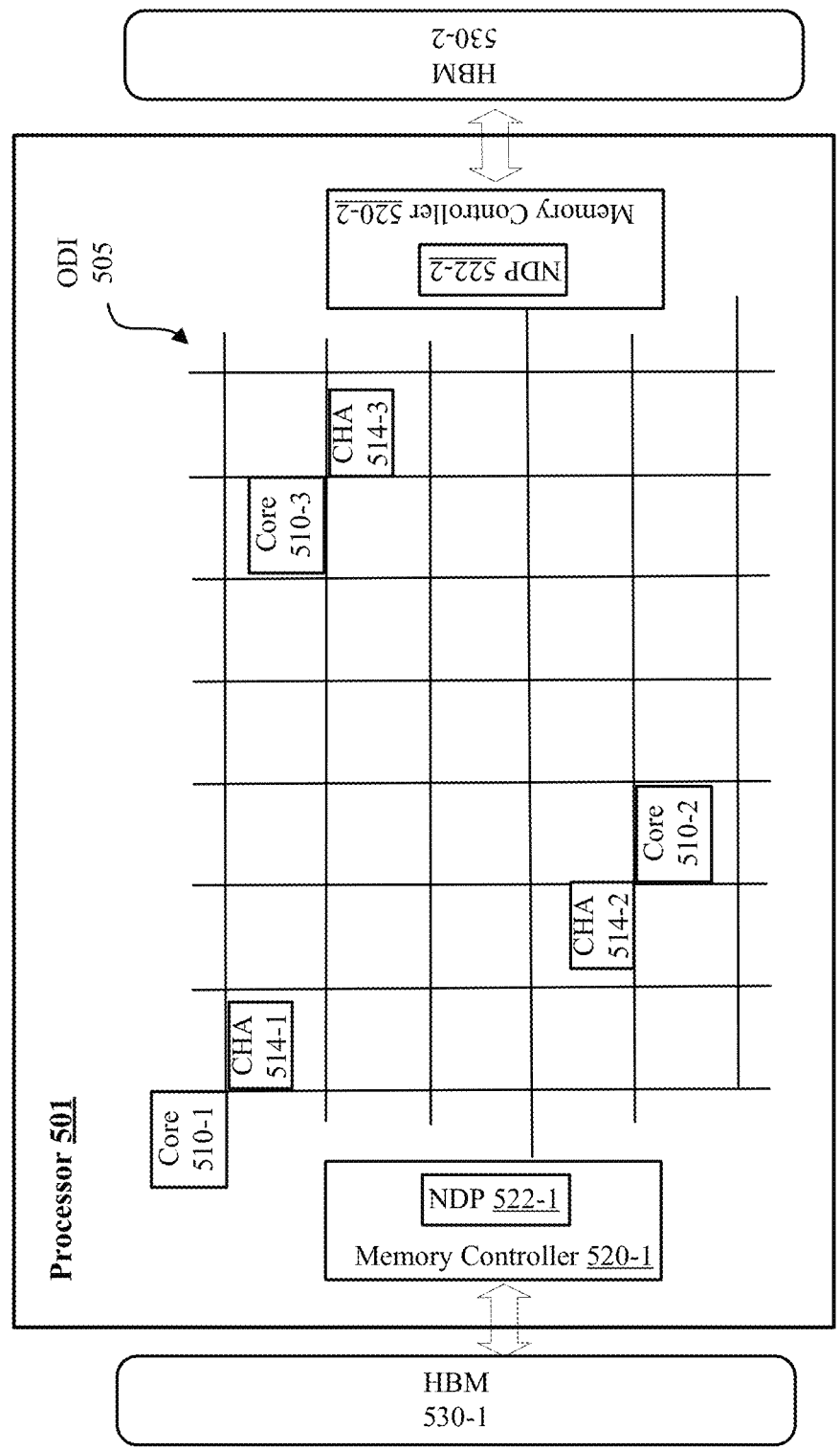
FIG. 5 illustrates an example second system.

FIG. 5 illustrates an example system 500. In some examples, as shown in FIG. 5, system 500 includes a processor 501 coupled with high bandwidth memory (HBM) 530-1 and 530-2 via respective memory controllers 520-1 and 520-2 that couple with cores 510-1, 510-2 and 510-3 via an on-die interconnect (ODI) 505. For these examples, processor 501 may include additional cores and/or memory controllers coupled with ODI 505, but only three cores and two memory controllers are shown for simplicity purposes. Similar to ODI 105 mentioned above for system 100 in FIG. 1, ODI 505 may couple memory controllers 520-1 and 520-2 to cores of processor 501 as part of a mesh network. Also, similar to what was mentioned for ODI 105, ODI 505 may allow for at least some elements of cores 510-1, 510-2 and 510-3 to couple with memory controllers 520-1 and 520-2. For example, cache home agents (CHAs) 514-1, 514-2 and 514-3 that manage cache lines maintained in respective core-specific caches for respective cores 510-1, 510-2 and 510-3 may be able to communicate with NDPs 522-1 and 522-2 via ODI 505 in order to facilitate efficient near data processing (e.g., to execute offloaded kernels or applications having data access characteristics with a low level of spatial or temporal locality).

According to some examples, NDP 522-1 and NDP 522-2 may separately have high bandwidth, low latency access to respective HBM 530-1 and HBM 530-2. A user of processor 501 may cause a device driver (not shown) that manages/controls NDP 522-1 or NDP 522-2 to intelligently partition data to limit data access to NDPs not directly accessing an HBM. For example, an intelligent partition of data would limit NDP 522-1's access to data maintained in HBM 130-2 and vice versa for NDP 522-2's access to data maintained in HBM 130-1. However, for functional completeness, some applications or kernels may require a low frequency of accesses by an NDP to other, non-directly accessible memory or HBM stack(s).

In some examples, an inter-memory controller network between memory controller 520-1 and memory controller 520-2 may be established using ODI 505 to enable NDPs to have at least a low frequency access to non-directly accessible HBMs. For these examples, during a system boot process, NDP 522-1 and NDP 522-2 would separately register (e.g., via a device driver of an operating system) as an agent communicatively coupled to or on ODI 505. Once registered as an agent on ODI 505, NDP 522-1 or NDP 522-2 may make requests to other memory controllers. For example, NDP 522-1 may make a request to memory controller 520-2 to access data maintained in HBM 530-2. According to some examples, registration of NDPs 522-1 and 522-2 as agents on ODI 505 may be used as an inter-memory controller for other features like data transfers between HBM 530-1 and 530-2 without a need to engage with or involve any cores of processor 501.

Figure 6:
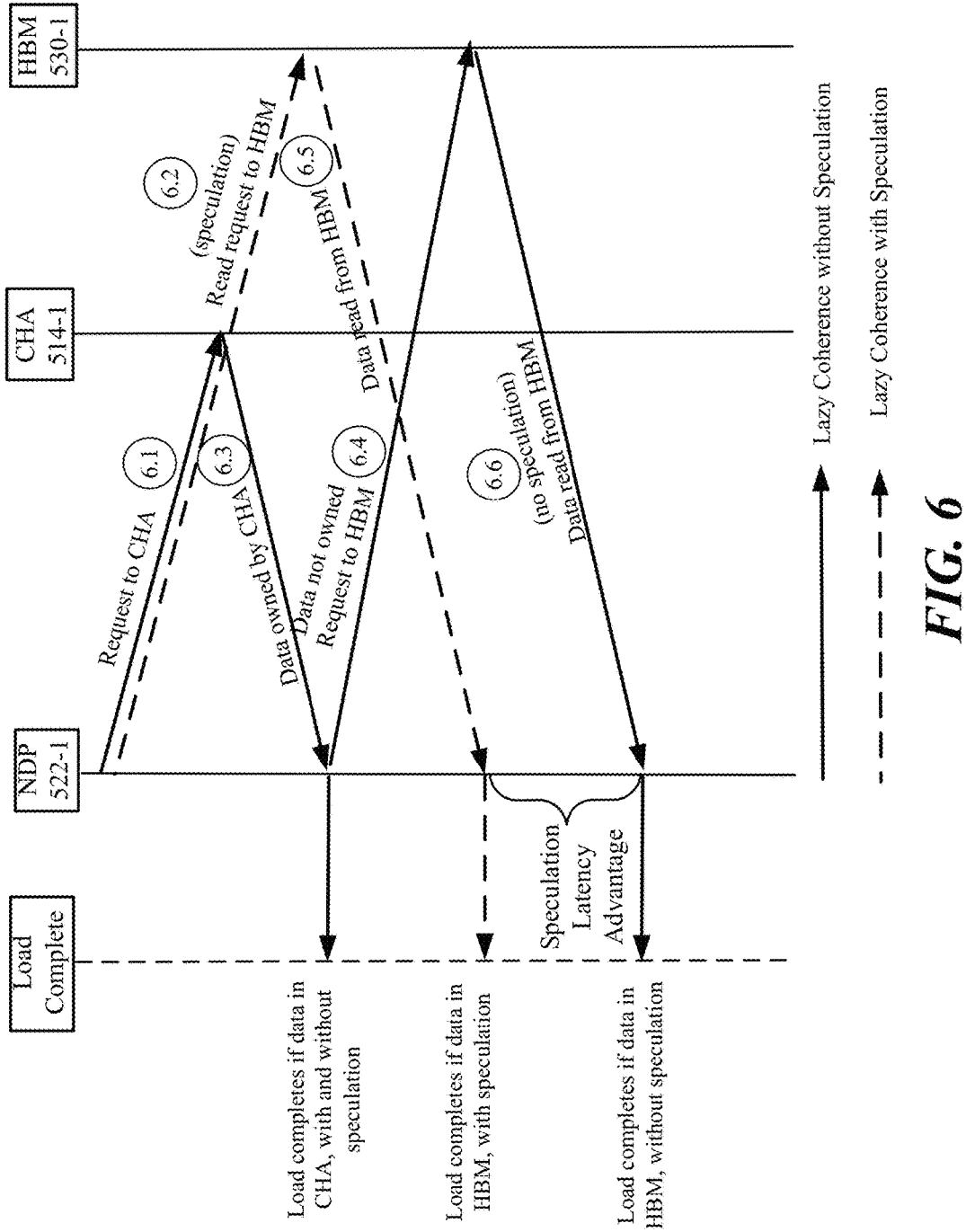
FIG. 6 illustrates an example first process.

FIG. 6 illustrates an example process 600. In some examples, process 600 may be an example process implemented to enable an NDP such as NDP 522-1 to avoid possible execution fails due to possible cache coherency issues with cores of processor 501 for data loaded to NDP 522-1 that is also maintained in shared memory regions of HBM 530-1 or 530-2, but the cores rarely access the data maintained in these shared memory regions at the same time as NDP 522-1. For these examples, process 600 shows a latency advantage for implementing a lazy coherence with speculation for loading data accessed from a shared memory region of HBM 530-1 compared to lazy coherence without speculation. Implementing lazy coherence with speculation may not always be an option or can be expensive in terms of performance impacts for some types of near data processors or accelerator architectures. For example, a significant fraction of data accessed by an NDP such as NDP 522-1 may be in HBM 530-1. Therefore, latency costs to ensure coherency should be minimized. As described more below for process 600, logic and/or features of NDP 522-1 may speculatively make requests to HBM 530-1 and CHA 514-1 simultaneously to minimize possible latency hits due to ensuring coherency.

Beginning at 6.1, logic and/or features of NDP 522-1 send a read request to CHA 514-1 to indicate a need to access data maintained in a shared region of HBM 530-1 for use to execute a kernel, an application, or a loop routine. The read request placed in 6.1 is a solid line to indicate that the read request is without speculation. In other words, no speculation is made that CHA 514-1 will not own or control a cache line or core 510-1 is not currently using the data maintained in the shared region of HBM 530-1.

Moving to 6.2, the logic and/or features of NDP 522-1 may also send a read request to HBM 530-1 to read the data maintained in the shared region at substantially the same time as sending the read request to CHA 514-1. The read request placed at 6.2 is a dashed line to indicate that a speculation is made that CHA 514-1 does not own or control a cache line or core 510-1 is using the data NDP 522-1 is requesting.

Moving to 6.3, CHA 514-1 indicates that the requested data is owned or controlled by CHA 514-1 and logic and/or features of NDP 522-1 may receive the data from core 510-1 cache line to load that cache line data for processing and the load is complete for use to execute the kernel, the application, or the loop routine. Process 600 may stop at this point and responses from HBM 530-1 for the data may be ignored or discarded by the logic and/or features of NDP 522-1.

Moving to 6.4, CHA 514-1 indicates a cache line to the data maintained in the shared memory region of HBM 530-1 is not owned or controlled by CHA 514-1 or is not being used by core 510-1. This indication by CHA 514-1 results in the logic and/or features of NDP 522-1 determining that no coherency issues exists for directly accessing the data maintained in the shared memory region of HBM 530-1. The solid line for 6.4 indicates that logic and/or features of NDP 522-1 had to place a read request after first receiving an indication from CHA 514-1 that CHA 514-1 did not own or control the cache line and no coherency issues exist to access the data from HBM 530-1.

Moving to 6.5, the logic and/or features of NDP 522-1 may receive the data requested from HBM 530-1 responsive to the lazy coherence with speculation request made at 6.2. Logic and/or features of NDP 522-1 may load that data received from HBM 530-1 for use to execute the kernel, the application, or the loop routine.

Moving to 6.6, data read from HBM 530-1 is received following a lazy coherence without speculation request. Process 600 may come to an end for lazy coherence without speculation.

In some examples, as shown in FIG. 6, the speculation latency advantage is shown to indicate that some latency advantage may be gained when a lazy coherence with specification is implemented and CHA 514-1 does not own or control the cache line to the data maintained in the shared memory region of HBM 530-1. In other words, speculation that CHA 514-1 would not own or control the cache line and simultaneously submitting a read request to HBM 530-1 helps to mitigate possible latency hits associated with maintaining coherency for data accessed from a shared memory region of HBM 530-1.

According to some examples, logic and/or features of NDP 522-1 may default to always waiting for a response from CHA 514-1 before loading data for use to execute the kernel, the application, or the loop routine. That way, if the response from CHA 514-1 at 6.3 is received after a response from HBM 530-1 at 6.5, the logic and/or features of NDP 522-1 may ensure the data is correct or coherent before using the data to execute the kernel, the application, or the loop routine.

In some examples, logic and/or features of NDP 522-1 may perform an occasional or periodic calibration of speculation for data maintained in a shared region of memory for HBM 530-1. For these examples, memory operations may be further optimized by tracking success of speculative loads from memory to reduce false speculations. If previous loads of the data received from HBM 530-1 fail, (e.g., CHA 514-1 owned the cache line or had a more up to date value for the data) then future speculations may fail as well. The logic and/or features of NDP 522-1 may stop lazy coherence with speculation if a number of fails reaches a threshold over a given period of time. Speculation may be stopped for a period of time and then started again and continue to be tracked for success or failure to determine whether to again stop lazy coherence with speculation, at least for the period of time.

Figure 7:
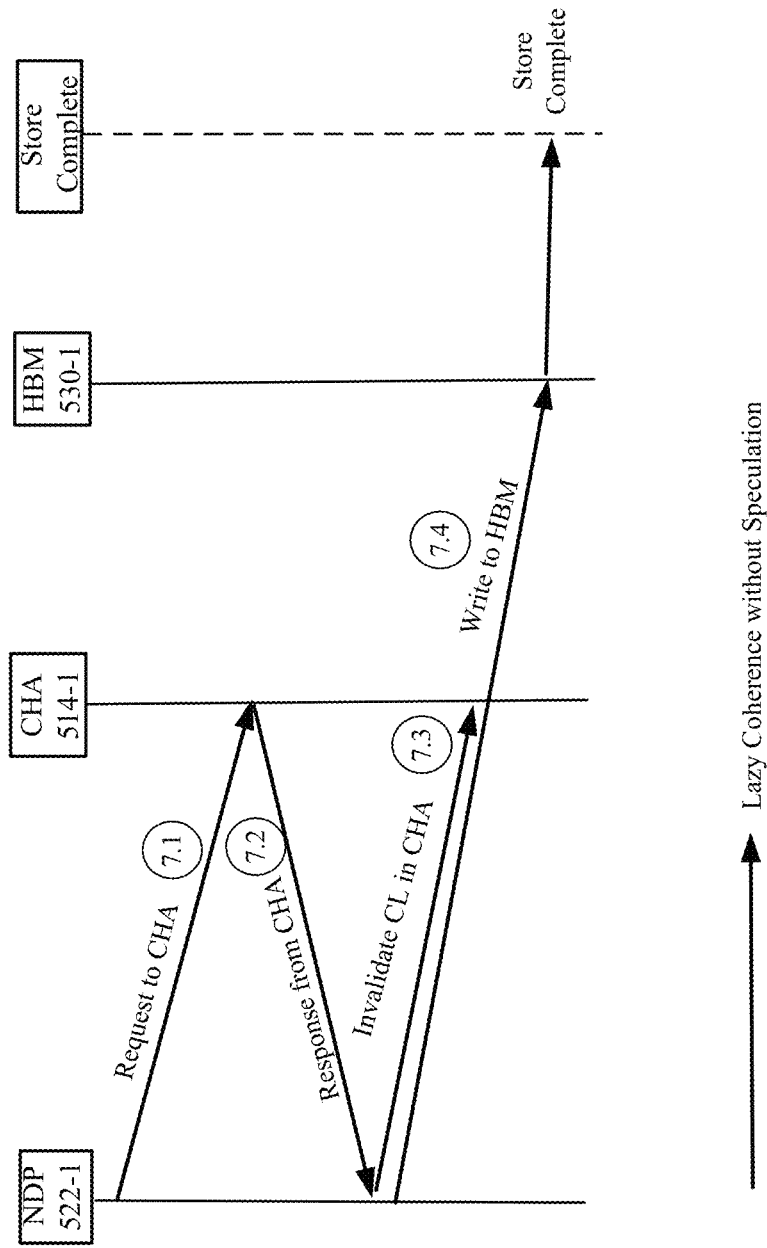
FIG. 7 illustrates an example second process.

FIG. 7 illustrates an example process 700. In some examples, process 700 may be another example process implemented to enable an NDP such as NDP 522-1 to avoid possible execution fails due to cache coherency issues with cores of processor 501 for data to be stored in shared memory regions of HBM 530-1 or 530-2 but the cores rarely access data to be stored in these shared memory regions at the same time as NDP 522-1. For these examples, process 700 may be implemented when a CHA for a core such as CHA 514-1 for core 510 has a full cache line (CL) ownership or control for data maintained in a shared memory region of HBM 530-1, and new values are to be stored to HBM 530-1 at the shared memory region of HBM 530-1. The new values, for example, generated by PEs of NDP 522-1 when executing an application, a kernel, or a loop routine.

Beginning at 7.1, logic and/or features of NDP 522-1 send a request to CHA 514-1 to indicate that a new value has been generated for data that is to be stored to a shared memory region of HBM 530-1. For process 700, only lazy coherence without speculation is shown to show a simplified example when CHA 514-1 has full CL ownership or control and new values are to be stored to the shared memory region of HBM 530-1.

Moving to 7.2, CHA 514-1 indicates that it has full CL ownership or control. In some examples, CHA 514-1 may provide the data included in the CL to logic and/or features of NDP 522-1 to indicate that CL ownership or control.

Moving to 7.3, the logic and/or features of NDP 522-1 may send an indication to CHA 514-1 that the data in the CL owned or controlled by CHA 514-1 is out-of-date or invalid. For example, by indicating new values to be stored to the shared memory region of HBM 530-1.

Moving to 7.4, the logic and/or features NDP 522-1 may also send the new values to the shared memory region of HBM 530-1 to store the new values. Process 700 then comes to an end.

Figure 8:
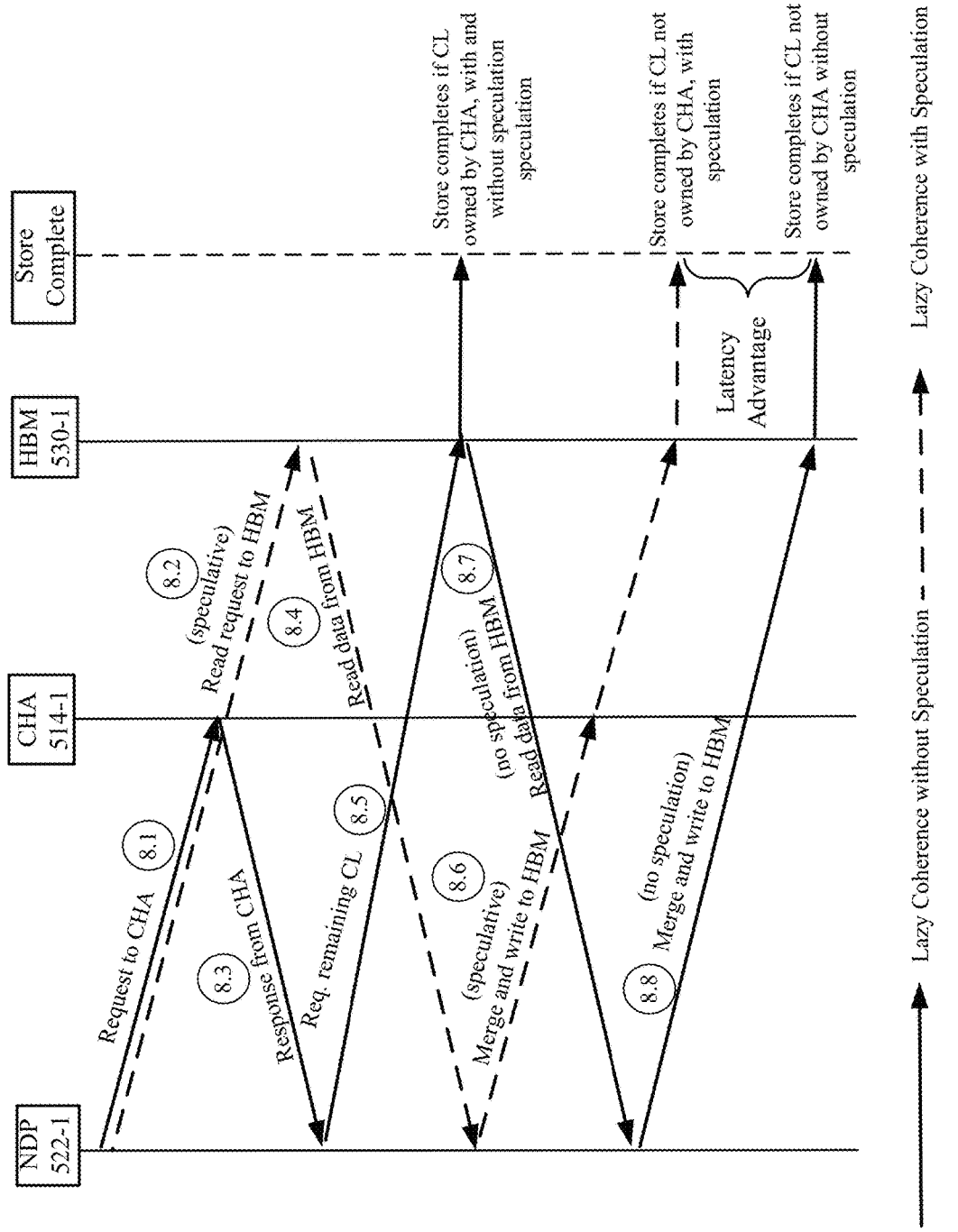
FIG. 8 illustrates an example third process.

FIG. 8 illustrates an example process 800. In some examples, process 800 may be another example process implemented to enable an NDP such as NDP 522-1 to avoid possible execution fails due to cache coherency issues with cores of processor 501 for data to be stored in shared memory regions of HBM 530-1 or 530-2 but the cores rarely access data to be stored in these shared memory regions at the same time as NDP 522-1. For these examples, process 800 may be implemented when a CHA for a core such as CHA 514-1 for core 510 has partial CL ownership or control pertaining to a CL used by CHA 514-1 to access data maintained in a shared memory region of HBM 530-1 and new values are to be stored to HBM 530-1 at the same shared memory region of HBM 530-1 accessed by the CL used by CHA 514-1. The new values, for example, generated by PEs of NDP 522-1 when executing an application, kernel, or loop routine using data maintained in a shared memory region of HBM 530-1.

Beginning at 8.1, logic and/or features of NDP 522-1 send a request to CHA 514-1 to indicate that a new value has been generated for data that is to be stored to a shared memory region of HBM 530-1. For process 800, both lazy coherence without speculation (solid line) and lazy coherence with speculation (dashed line) are shown to indicate a possible speculation latency advantage when CHA 514-1 only has a partial CL ownership or control and new values are to be stored to the shared memory region of HBM 530-1.

Moving to 8.2, the logic and/or features of NDP 522-1 may also send a read request to HBM 530-1 to read the data maintained in the shared region at substantially the same time as sending the request to CHA 514-1. The sending of a request to both CHA 514-1 and HBM 530-1 reflects a speculation that CHA 514-1 does not have a full CL ownership or control.

Moving to 8.3, CHA 514-1 responds to the request by indicating only partial CL ownership or control. In some examples, CHA 514-1 may provide the data in the partially owned or controlled CL to logic and/or features of NDP 522-1 to indicate the partially owned or controlled CL and for the logic and/or features to determine what values are included in the partially owned or controlled CL.

Moving to 8.4, the logic and/or features of NDP 522-1 may read data from HBM 530-1 and based on the portion of the CL indicated as not being owned or controlled by CHA 514-1 determine what values in the data stored to the shared memory region of HBM 530-1 are to be updated. In some examples, the full CL may be returned due to the speculative request sent to HBM 530-1 at 8.2 and the logic and/or features of NDP 522-1 only read the portion of the CL not owned or controlled by CHA 514-1.

Moving to 8.5, the logic and/or features of NDP 522-1 may place a request to HBM 530-1 for the remaining portion of the CL not owned or controlled by CHA 514-1. According to some examples, the request to HBM 530-1 is needed due to the lack of speculation. Store may be complete for process 800 at this point with and without speculation.

Moving to 8.6, the logic and/or features of NDP 522-1 may merge the data in the partially owned or controlled CL with the new values and then send the merged data to be stored in the shared memory region of HBM 530-1. As a result, store is complete if CL is not owned or controlled by CHA 514-1, with speculation. In some examples, the logic and/or features of NDP 522-1 may send an indication to CHA 514-1 that the data in the partially owned or controlled CL is out-of-date or invalid by indicating new values to be stored to the shared memory region of HBM 530-1 that are associated with the partially owned or controlled CL. Process 700 then comes to an end for a lazy coherence with speculation.

Moving to 8.7, the logic and/or features of NDP 522-1 may receive a response from HBM 530-1 that enable NDP 522-1 to read from HBM 530-1. In some examples, the logic and/or features of NDP 522-1 may read the portion of the CL indicated as not being owned or controlled by CHA 514-1 to determine what values in the data stored to the shared memory region of HBM 530-1 are to be updated.

Moving to 8.8, the logic and/or features of NDP 522-1 merge the portion of the CL indicated as being owned or controlled by CHA 514-1 with the new values and then send the merged data to be stored in the shared memory region of HBM 530-1. Store may be complete for process 800 if CL is not owned or controlled by CHA 514-1, without speculation.

In some examples, as shown in FIG. 8, the speculation latency advantage is shown to indicate that some latency advantage may be gained when a lazy coherence with specification is implemented and CHA 514-1 only partially owns or controls the cache line to the data maintained in the share memory region of HBM 530-1. In other words, speculation that CHA 514-1 would not fully own or control the cache line and simultaneously submitting a read request to HBM 530-1 helps to mitigate possible latency hits associated with maintaining coherency for data accessed from a shared memory region of HBM 530-1.

Figure 9:
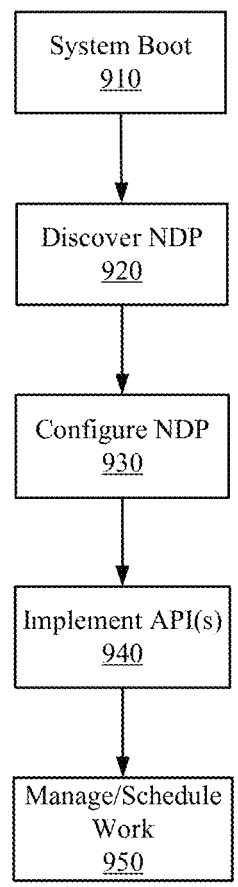
FIG. 9 illustrates an example first logic flow.

FIG. 9 illustrates an example logic flow 900. In some examples, logic flow 900 may illustrate a logic flow to configure and manage an NDP such as NDP 522-1 shown in FIG. 5. For these examples, logic flow may be implemented by elements of an operating system (OS) executed by one or more elements of a processor such as cores of processor 501 shown in FIG. 5. The elements of the OS may include, for example, a device driver. Examples are not limited to an OS executed by processor 501.

According to some examples, logic flow 900 at block 910 indicates a system boot. For example, system 500 shown in FIG. 5 may be booted or powered up.

In some examples, for logic flow 900 at block 920 an NDP such as NDP 522-1 may be discoverable by a device driver for an OS such as an OS executed by one or more elements of processor 501. Discovering NDP 522-1 may include recognizing that NDP 522-1 is an accelerator resource of memory controller 520-1 to facilitate near data processing of data primary stored to HBM 530-1.

According to some examples, logic flow 900 at block 930 may configure NDP 522-1 for operation. For these examples, configuration of NDP 522-1 may include the device driver registering NDP 522-1 as an agent communicatively coupled to ODI 505 that enables NDP 522-1 to communicate with CHAs for cores of processor 501 as well as communicate with other memory controllers such as memory controller 520-2.

In some examples, logic flow 900 at block 940 may establish application interface (APIs) to allow applications or parallel language runtime libraries (e.g., OpenMP) to create and manage context/threads and/or request work to be scheduled to NDP 522-1. For these examples, the device driver may enable the APIs for NDP 522-1.

According to some examples, logic flow 900 a block 950 may manage/schedule work for NDP 522-1. For these examples, the device driver may identify applications, kernels or loop routines that may have data access characteristics that may be the best candidates for offloading work to NDP 522-1 (e.g., low level of spatial or temporal locality for data maintained in HBM 530-1). In some examples, cores of processor 501 may submit work to NDP 522-1 based on requested work placed by applications or parallel language runtime libraries via the established APIs. For these examples, the cores may submit work to NDP 522-1 by writing into a request queue. Results or responses generated by NDP 522-1 may be written to a response queue.

In some examples, a low latency interface path may be used for critical tasks (e.g., needed to meet performance requirements) such as offloading a kernel to NDP 522-1. A higher latency interface path may be used for tasks that are not critical tasks (e.g., little or no relation to meeting at least some performance requirements). For these examples, a device driver may determine which interface path to use in order to maximize performance when a high level of performance is needed for an offloaded application, kernel, or loop routine.

Figure 10:
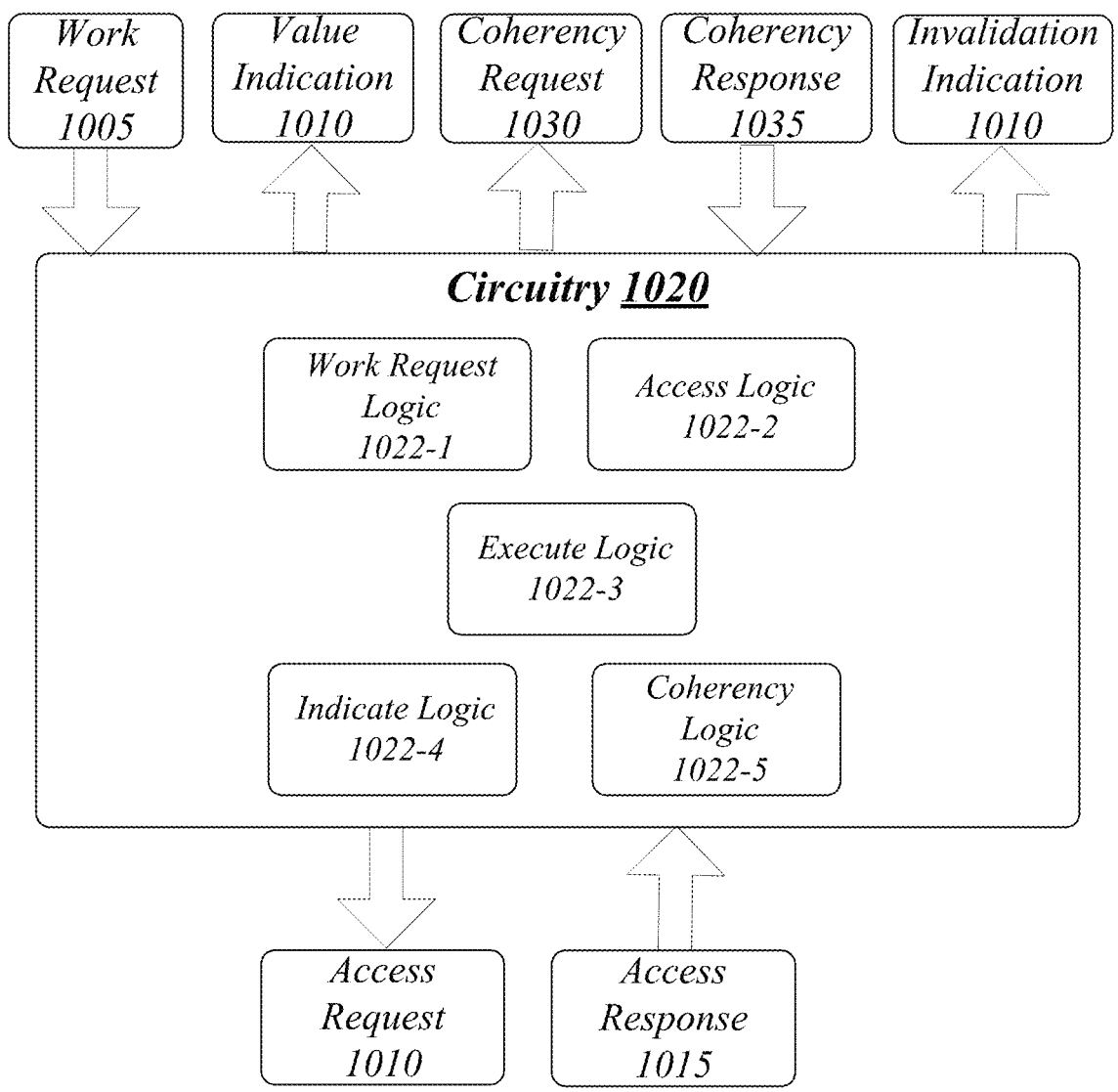
FIG. 10 illustrates an example apparatus.

FIG. 10 illustrates an example apparatus 1000. Although apparatus 1000 shown in FIG. 10 has a limited number of elements in a certain topology, it may be appreciated that the apparatus 1000 may include more or less elements in alternate topologies as desired for a given implementation.

According to some examples, apparatus 1000 may be supported by circuitry 1020 and apparatus 1010 may be a near data processor included in a memory controller of a processor. For example, near data processors 122-1 to 122-N included in respective memory controllers 120-1 to 120-N of processor 101 as shown in FIG. 1 or near data processors 522-1 and 522-1 included in respective memory controllers 520-1 and 520-2 of processor 501. Circuitry 1020 may be arranged to execute one or more software or firmware implemented logic, components, or modules 1022-a (e.g., implemented, at least in part, by a controller of a memory device). It is worthy to note that "a" and "b" and "c" and similar designators as used herein are intended to be variables representing any positive integer. Thus, for example, if an implementation sets a value for a=5, then a complete set of software or firmware for logic, components or modules 1022-*a* may include logic 1022-1, 1022-2, 1022-3, 1022-4 or 1022-5. Also, at least a portion of "logic" may be software/firmware stored in computer-readable media, or may be implemented, at least in part in hardware and although the logic is shown in FIG. 10 as discrete boxes, this does not limit logic to storage in distinct computer-readable media components (e.g., a separate memory, etc.) or implementation by distinct hardware components (e.g., separate application specific integrated circuits (ASICs) or field programmable gate arrays (FPGAs)).

According to some examples, circuitry 1020 may include at least a portion of one or more ASICs or programmable logic (e.g., FPGA) and, in some examples, at least some logic 1022-*a* or processing resources (e.g., PEs) may be implemented as hardware elements of these ASICs or programmable logic.

In some examples, apparatus 1000 may include a work request logic 1022-1. Work request logic 1022-1 may be a logic and/or feature executed by circuitry 1020 to receive a work request to execute a kernel, an application, or a loop routine using data maintained in a memory region of a first memory device coupled with apparatus 1000 via at least one memory channel. For these examples, the work request may be included in work request 1005 and the requester may be a core from among a plurality of cores. The core coupled with the memory controller that includes apparatus 1000 via an on-die interconnect.

According to some examples, apparatus 1000 may also include an access logic 1022-2. Access logic 1022-2 may be a logic and/or feature executed by circuitry 1020 to access the data maintained in the memory region. For these examples, the access request may be included in access request 1010 and the data accessed may be included in access response 1015.

In some examples, apparatus 1000 may also include an execute logic 1022-3. Execute logic 1022-3 may be a logic and/or feature executed by circuitry 1020 to generate values responsive to execution of the kernel, the application, or the loop routine using the data included in access response 1015.

According to some examples, the memory controller that includes apparatus 1000 may also couple with a second memory controller of the processor via the same on-die interconnect that couples the memory controller to the core as mentioned above. For these examples, the second memory controller may control access to a second memory device. Access logic 1022-2 may be arranged to serve as an agent on the on-die interconnect to access data maintained in the second memory device through the second memory controller. Execute logic 1022-3 may execute at least a portion of the kernel, the application, or the loop routine using the accessed data maintained in the second memory device to generate values.

According to some examples, apparatus 1000 may also include indicate logic 1022-4. Indicate logic 1022-4 may be a logic and/or feature executed by circuitry 1020 to indicate to a requester of the work request that the values have been generated. As mentioned above, the requestor may be a core coupled with the memory controller that includes apparatus 1000 via an on-die interconnect. Indicate logic 1022-4 may cause an indication to be provided the core via value indication 1025.

In some examples, apparatus 1000 may also include a coherency logic 1022-5. Coherency logic 1022-5 may be a logic and/or feature executed by circuitry 1020 to send coherency requests to a CHA of the core of the processor that placed the work request. For these examples, the CHA manages a cache hierarchy for the core based on a shared memory region of the first memory device via which data used to execute the kernel, the application, or the loop routine are obtained and/or result values generated by execute logic 1022-3 are stored. Coherency logic 1022-5 may send a coherency request 1030 to CHA of the core to determine whether the core has a cache hierarchy that includes data obtained from the shared memory region (e.g., via a cache line) where the result values are to be stored and/or the data used to execute the kernel, the application, or the loop routine is to be accessed. Concurrently, access logic 1022-2 may send access request 1010 to the first memory device to access the data maintained in the memory region that corresponds to the cache line. Coherency logic 1022-5 may receive, responsive to coherency request 1010, an indication that the data is not included in the cache hierarchy for the core via coherency response 1035. Access logic 1022-2 may then receive an access response 1015 from the first memory device that includes the data maintained in the shared memory region. Execute logic 1022-3 may then execute the kernel, the application, or the loop routine using the data included in access response 1015. In an alternative example, coherency logic 1022-5 may have received a coherency response 1035 that indicates that the data is included in the cache for the core. For this alternative example, coherency response 1035 may include the data or allow access logic 1022-2 to obtain the data from the cache hierarchy for the core. Execute logic 1022-3 may then execute the kernel, the application, or the loop routine using the data obtained from the cache for the core. Access response 1015 from the first memory device, for this alternative example, may be discarded or ignored.

FIG. 11 illustrates an example of a logic flow 1100. Logic flow 1100 may be representative of some or all of the operations executed by one or more logic, features, or devices described herein, such as logic and/or features included in apparatus 800. More particularly, logic flow 1000 may be implemented by one or more of work request logic 1022-1, access logic 1022-2, execute logic 1022-3 or indicate logic 1022-4.

According to some examples, as shown in FIG. 11, logic flow 1100 at block 1102 may receive, at a near data processor of a memory controller of a processor, a work request to execute a kernel, an application, or a loop routine using data maintained in a memory region of a first memory device coupled with the near data processor via at least one memory channel. For these examples, work request logic 1022-1 may receive the work request.

In some examples, logic flow 1100 at block 1104 may access the data maintained in the memory region to generate values responsive to execution of the kernel, the application, or the loop routine. For these examples, access logic 1022-2 may access the data and execute logic 1022-3 may use the data to generate the values.

According to some examples, logic flow 1100 at block 1106 may indicate to a requester of the work request that the values have been generated. For these examples, indicate logic 1022-4 may make the indication to the requester.

The set of logic flows shown in FIGS. 9 and 11 may be representative of example methodologies for performing novel aspects described in this disclosure. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 12 illustrates an example of a first storage medium. As shown in FIG. 12, the first storage medium includes a storage medium 1200. The storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
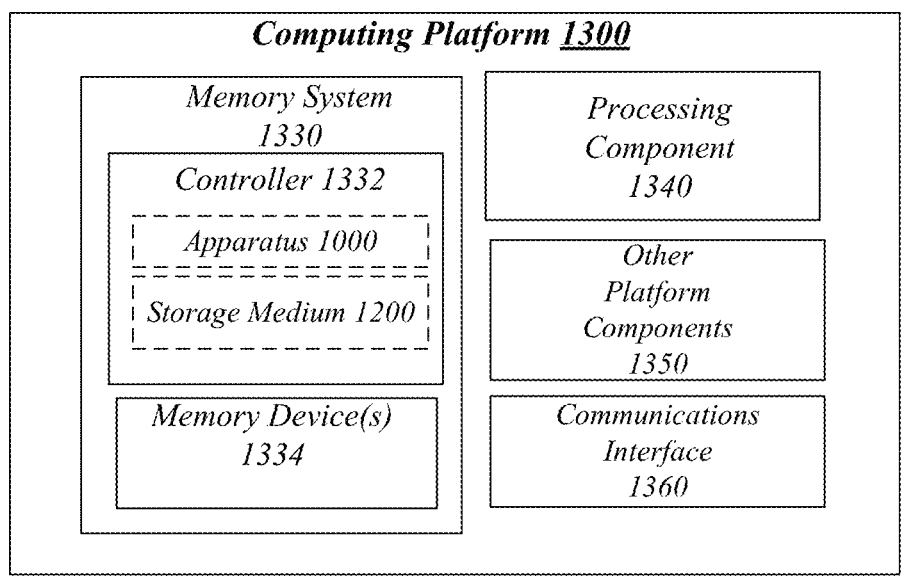
FIG. 13 illustrates an example computing platform.

FIG. 13 illustrates an example computing platform 1300. In some examples, as shown in FIG. 13, computing platform 1300 may include a memory system 1330, a processing component 1340, other platform components 1350 or a communications interface 1360. According to some examples, computing platform 1300 may be implemented in a computing device.

According to some examples, memory system 1330 may include a controller 1332 and a memory 1334. For these examples, circuitry resident at or located at controller 1332 may be included in a near data processor and may execute at least some processing operations or logic for apparatus 1000 based on instructions included in a storage media that includes storage medium 1200. Also, memory 1334 may include similar types of memory that are described above for system 100 shown in FIG. 1. For example, types of memory included in memory 130-1 to 130-N shown in FIG. 1.

According to some examples, processing components 1340 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

According to some examples, processing component 1340 may include and infrastructure processing unit (IPU) or data processing unit (DPU) or may be utilized by an IPU or DPU. An xPU may refer at least to an IPU, DPU, graphic processing unit (GPU), general-purpose GPU (GPGPU). An IPU or DPU may include a network interface with one or more programmable or fixed function processors to perform offload of operations that could have been performed by a CPU. The IPU or DPU can include one or more memory devices (not shown). In some examples, the IPU or DPU can perform virtual switch operations, manage storage transactions (e.g., compression, cryptography, virtualization), and manage operations performed on other IPUs, DPUs, servers, or devices.

In some examples, other platform components 1350 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices included in other platform components 1350 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1360 may include logic and/or features to support a communication interface. For these examples, communications interface 1360 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1300 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1300 described herein, may be included or omitted in various embodiments of computing platform 1300, as suitably desired.

The components and features of computing platform 1300 may be implemented using any combination of discrete circuitry, ASICs, logic gates and/or single chip architectures. Further, the features of computing platform 1300 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

It should be appreciated that the exemplary computing platform 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Although not depicted, any system can include and use a power supply such as but not limited to a battery, AC-DC converter at least to receive alternating current and supply direct current, renewable energy source (e.g., solar power or motion based power), or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to additional examples of technologies disclosed herein.

Example 1. An example apparatus may include a memory controller of a processor to couple with multiple cores of the processor via an on-die interconnect. The memory controller may control access to a first memory device and may also include a near data processor. The near data processor may include circuitry to execute a kernel, an application, or a loop routine using data maintained in the first memory device. The data maintained in the first memory device may be directly accessible to the near data processor via at least one memory channel coupled with the first memory device. The near data processor may also include a plurality of memory buffers arranged to receive a work request from a core from among the multiple cores and also arranged to indicate that values have been generated by the circuitry responsive to the work request.

Example 2. The apparatus of example 1 may also include the memory controller to couple with a second memory controller of the processor via the on-die interconnect. The second memory controller may control access to a second memory device. For this example, the near data processor may be arranged to serve as an agent on the on-die interconnect to access data maintained in the second memory device through the second memory controller. The circuitry to execute at least a portion of the kernel, the application, or the loop routine may use the accessed data maintained in the second memory device.

Example 3. The apparatus of example 1, the data maintained in the first memory device may include the data being maintained in a memory region of the first memory device shared with the core from among the multiple cores. For this example, the circuitry may further send a coherency request to a coherency agent of the core to determine whether the data for use to execute the kernel, the application, or the loop routine is included in a cache for the core. The circuitry may also concurrently send an access request to the first memory device to access the data maintained in the memory region. The circuitry may also receive, responsive to the coherency request, an indication that the data is not included in the cache for the core. The circuitry may also receive, responsive to the access request, the data maintained in the memory region and use the data maintained in the memory region to execute the kernel, the application, or the loop routine.

Example 4. The apparatus of example 1, the data maintained in the first memory device may include the data maintained in a memory region of the first memory device shared with the core from among the multiple cores. For this example, the circuitry may send a coherency request to a coherency agent of the core to determine whether the data for use to execute the kernel, the application, or the loop routine is included in a cache for the core. The circuitry may also concurrently send an access request to the first memory device to access the data maintained in the memory region. The circuitry may also receive, responsive to the coherency request, an indication that the data is included in the cache for the core and use the data included in the cache for the core to execute the kernel, the application, or the loop routine.

Example 5. The apparatus of example 1, the generated values may be stored to a memory region of the first memory device shared with the core from among the multiple cores. For this example, the circuitry may send a coherency request to a coherency agent of the core to determine whether the coherency agent controls a cache line that includes data from the memory region. The circuitry may also receive, responsive to the coherency request, an indication that the coherency agent controls a cache line that includes data from the memory region. The circuitry may also send an indication to the coherency agent that data included in the cache line is invalid and cause the values to be stored to the memory region.

Example 6. The apparatus of example 1, the generated values may be stored to a memory region of the first memory device shared with the core from among the multiple cores. For this example, the circuitry may send a coherency request to a coherency agent of the core to determine whether the coherency agent controls a cache line that includes data from the memory region where the generated values are to be stored. The circuitry may also concurrently send an access request to the first memory device to access the data maintained in the memory region that corresponds to the cache line. The circuitry may also receive, responsive to the coherency request, an indication that the coherency agent controls a cache line that includes only a portion of the data from the memory region. The circuitry may also receive, responsive to the access request, the data maintained in the memory region. The circuitry may also send an indication to the coherency agent that the cache line includes invalid data and cause the values to be stored to the memory region.

Example 7. The apparatus of example 1, the first memory device may include an HBM stack resident on a separate chip from the memory controller and the multiple cores of the processor. For this example, the HBM stack may include dynamic random access memory.

Example 8. The apparatus of example 7, the data may be directly accessible to the near data processor via the at least one memory channel coupled with the HBM stack. For this example, the at least one memory channel may be arranged to operate in compliance with a JEDEC specification to include HBM version 2, JESD235C.

Example 9. An example method may include receiving, at a near data processor of a memory controller of a processor, a work request to execute a kernel, an application, or a loop routine using data maintained in a memory region of a first memory device coupled with the near data processor via at least one memory channel. The method may also include accessing the data maintained in the memory region to generate values responsive to execution of the kernel, the application, or the loop routine. The method may also include indicating to a requester of the work request that the values have been generated.

Example 10. The method of example 9 may also include receiving the work request in a memory buffer of the near data processor. For this example, circuitry of the near data processor may be arranged to execute the kernel, the application or the loop routine using the data maintained in the memory region of the first memory device.

Example 11. The method of example 10, the requester of the work request may include a core of the processor, the core coupled with the memory controller via an on-die interconnect.

Example 12. The method of example 11, comprising the memory controller of the processor to couple with a second memory controller of the processor via the on-die interconnect. The second memory controller may control access to a second memory device. For this example, the near data processor may be arranged to serve as an agent on the on-die interconnect to access data maintained in the second memory device through the second memory controller. Also, the circuitry may execute at least a portion of the kernel, the application, or the loop routine using the accessed data maintained in the second memory device.

Example 13. The method of example 11, the data maintained in the first memory device may include the data maintained in a memory region of the first memory device shared with the core of the processor. The method may further include the near data processor sending a coherency request to a coherency agent of the core to determine whether the data for use to execute the kernel, the application, or the loop routine is included in a cache for the core.

The method may also include the near data processor concurrently sending an access request to the first memory device to access the data maintained in the memory region. The method may also include the near data processor receiving, responsive to the coherency request, an indication that the data is not included in the cache for the core. The method may also include the near data processor receiving, responsive to the access request, the data maintained in the memory region; and using the data maintained in the memory region to execute the kernel, the application, or the loop routine.

Example 14. The method of example 11, the data maintained in the first memory device may include the data maintained in a memory region of the first memory device shared with the core of the processor. For this example, the method may further include the near data processor sending a coherency request to a coherency agent of the core to determine whether the data for use to execute the kernel, the application, or the loop routine is included in a cache for the core. The method may also include the near data processor concurrently sending an access request to the first memory device to access the data maintained in the memory region. The method may also include the near data processor receiving, responsive to the coherency request, an indication that the data is included in the cache for the core and using the data included in the cache for the core to execute the kernel, the application, or the loop routine.

Example 15. The method of example 11, the values to be stored to a memory region of the first memory device may be shared with the core of the processor. For this example, the method may further include the near data processor sending a coherency request to a coherency agent of the core to determine whether the coherency agent controls a cache line that includes data from the memory region. The method may also include the near data processor receiving, responsive to the coherency request, an indication that the coherency agent controls a cache line that includes data from the memory region. The method may also include the near data processor sending an indication to the coherency agent that data included in the cache line is invalid and causing the values to be stored to the memory region.

Example 16. The method of example 11, the values to be stored to a memory region of the first memory device may be shared with the core of the processor. For this example, the method may further include the near data processor sending a coherency request to a coherency agent of the core to determine whether the coherency agent controls a cache line that includes data from the memory region where the values are to be stored. The method may also include the near data processor concurrently sending an access request to the first memory device to access the data maintained in the memory region that corresponds to the cache line. The method may also include the near data processor receiving, responsive to the coherency request, an indication that the coherency agent controls a cache line that includes only a portion of the data from the memory region. The method may also include the near data processor receiving, responsive to the access request, the data maintained in the memory region. The method may also include the near data processor sending an indication to the coherency agent that the cache line includes invalid data and causing the values to be stored to the memory region.

Example 17. The method of example 11, the first memory device may include an HBM stack resident on a separate chip from the memory controller and the core of the processor. For this example, the HBM stack includes dynamic random access memory.

Example 18. The method of example 17, the data may be directly accessible to the near data processor via the at least one memory channel coupled with the HBM stack. For this example, the at least one memory channel may be arranged to operate in compliance with a JEDEC specification to include HBM version 2, JESD235C.

Example 19. An example at least one machine readable medium may include a plurality of instructions that in response to being executed by a system may cause the system to carry out a method according to any one of examples 9 to 18.

Example 20. An example apparatus may include means for performing the methods of any one of examples 9 to 18.

Example 21. An example system may include a first memory device, a plurality of cores of a processor and a first memory controller of the processor to couple with the plurality of cores via an on-die interconnect. The first memory controller may control access to the first memory device. The first memory controller may include a near data processor. The near data processor may include circuitry to execute a kernel, an application, or a loop routine using data maintained in the first memory device, the data directly accessible to the near data processor via at least one memory channel coupled with the first memory device. The near data processor may also include a plurality of memory buffers arranged to receive a work request from a core from among the plurality cores and arranged to indicate that values have been generated by the circuitry responsive to the work request.

Example 22. The system of example 21 may also include a second memory device and a second memory controller of the processor to couple with the plurality of cores and the first memory controller via the on-die interconnect. The second memory controller may control access to the second memory device. For this example, the near data processor may be arranged to serve as an agent on the on-die interconnect to access data maintained in the second memory device through the second memory controller. The circuitry to execute at least a portion of the kernel, the application, or the loop routine using the accessed data maintained in the second memory device.

Example 23. The system of example 21, the data maintained in the first memory device may include the data maintained in a memory region of the first memory device shared with the core from the plurality of cores. For this example, the circuitry of the near data processor may also send a coherency request to a coherency agent of the core to determine whether the data for use to execute the kernel, the application, or the loop routine is included in a cache for the core. The circuitry may also concurrently send an access request to the first memory device to access the data maintained in the memory region. The circuitry may also receive, responsive to the coherency request, an indication that the data is not included in the cache for the core. The circuitry may also receive, responsive to the access request, the data maintained in the memory region and use the data maintained in the memory region to execute the kernel, the application, or the loop routine.

Example 24. The system of example 21, the data maintained in the first memory device includes the data maintained in a memory region of the first memory device may be shared with the core from the plurality of cores. For this example, the circuitry of the near data processor may also send a coherency request to a coherency agent of the core to determine whether the data for use to execute the kernel, the application, or the loop routine is included in a cache for the core. The circuitry may also concurrently send an access request to the first memory device to access the data maintained in the memory region. The circuitry may also receive, responsive to the coherency request, an indication that the data is included in the cache for the core and use the data included in the cache for the core to execute the kernel, the application, or the loop routine.

Example 25. The system of example 21, the generated values to be stored to a memory region of the first memory device may be shared with the core from the plurality of cores. For this example, the circuitry of the near data processor may also send a coherency request to a coherency agent of the core to determine whether the coherency agent controls a cache line that includes data from the memory region. The circuitry may also receive, responsive to the coherency request, an indication that the coherency agent controls a cache line that includes data from the memory region. The circuitry may also send an indication to the coherency agent that data included in the cache line is invalid and cause the values to be stored to the memory region.

Example 26. The system of example 21, the generated values may be stored to a memory region of the first memory device shared with the core from the plurality of cores. For this example, circuitry of the near data processor may also send a coherency request to a coherency agent of the core to determine whether the coherency agent controls a cache line that includes data from the memory region where the generated values are to be stored. The circuitry may also concurrently send an access request to the first memory device to access the data maintained in the memory region that corresponds to the cache line. The circuitry may also receive, responsive to the coherency request, an indication that the coherency agent controls a cache line that includes only a portion of the data from the memory region. The circuitry may also receive, responsive to the access request, the data maintained in the memory region. The circuitry may also send an indication to the coherency agent that the cache line includes invalid data and cause the values to be stored to the memory region.

Example 27. The system of example 21, the first memory device may include an HBM stack resident on a separate chip from the first memory controller and the plurality of cores of the processor, wherein the HBM stack includes dynamic random access memory.

Example 28. The system of example 27, the data may be directly accessible to the near data processor via the at least one memory channel coupled with the HBM stack. For this example, the at least one memory channel may be arranged to operate in compliance with a JEDEC specification to include HBM version 2, JESD235C.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a memory controller at a processor, the memory controller to be configured to couple with multiple cores of the processor via an on-die interconnect, the memory controller to control access to a first memory device, the memory controller to include a near data processor, the near data processor to include:
   circuitry to execute a kernel, an application, or a loop routine using data maintained in the first memory device, the data directly accessible to the near data processor via at least one memory channel coupled with the first memory device; and
   a plurality of memory buffers arranged to receive a work request from a core from among the multiple cores and arranged to indicate that values have been generated by the circuitry responsive to the work request.

2. The apparatus of claim 1, further comprising the memory controller to be configured to couple with a second memory controller at the processor via the on-die interconnect, the second memory controller to control access to a second memory device, wherein the near data processor is arranged to serve as an agent on the on-die interconnect to access data maintained in the second memory device through the second memory controller, the circuitry to execute at least a portion of the kernel, the application, or the loop routine using the accessed data maintained in the second memory device.

3. The apparatus of claim 1, the data maintained in the first memory device comprises the data maintained in a memory region of the first memory device shared with the core from among the multiple cores, wherein the circuitry is further to:
   send a coherency request to a coherency agent of the core to determine whether the data for use to execute the kernel, the application, or the loop routine is included in a cache for the core;
   concurrently send an access request to the first memory device to access the data maintained in the memory region;
   receive, responsive to the coherency request, an indication that the data is not included in the cache for the core;
   receive, responsive to the access request, the data maintained in the memory region; and
   use the data maintained in the memory region to execute the kernel, the application, or the loop routine.

4. The apparatus of claim 1, the data maintained in the first memory device comprises the data maintained in a memory region of the first memory device shared with the core from among the multiple cores, wherein the circuitry is further to:
   send a coherency request to a coherency agent of the core to determine whether the data for use to execute the kernel, the application, or the loop routine is included in a cache for the core;

concurrently send an access request to the first memory device to access the data maintained in the memory region;
receive, responsive to the coherency request, an indication that the data is included in the cache for the core; and
use the data included in the cache for the core to execute the kernel, the application, or the loop routine.

5. The apparatus of claim 1, comprising the generated values to be stored to a memory region of the first memory device shared with the core from among the multiple cores, wherein the circuitry is further to:
send a coherency request to a coherency agent of the core to determine whether the coherency agent controls a cache line that includes data from the memory region;
receive, responsive to the coherency request, an indication that the coherency agent controls a cache line that includes data from the memory region;
send an indication to the coherency agent that data included in the cache line is invalid; and
cause the values to be stored to the memory region.

6. The apparatus of claim 1, comprising the generated values to be stored to a memory region of the first memory device shared with the core from among the multiple cores, wherein the circuitry is further to:
send a coherency request to a coherency agent of the core to determine whether the coherency agent controls a cache line that includes data from the memory region where the generated values are to be stored;
concurrently send an access request to the first memory device to access the data maintained in the memory region that corresponds to the cache line;
receive, responsive to the coherency request, an indication that the coherency agent controls a cache line that includes only a portion of the data from the memory region;
receive, responsive to the access request, the data maintained in the memory region;
send an indication to the coherency agent that the cache line includes invalid data; and
cause the values to be stored to the memory region.

7. The apparatus of claim 1, the first memory device comprising a high bandwidth memory (HBM) stack resident on a separate chip from the memory controller and the multiple cores of the processor, wherein the HBM stack includes dynamic random access memory.

8. The apparatus of claim 7, comprising the data directly accessible to the near data processor via the at least one memory channel coupled with the HBM stack, wherein the at least one memory channel is arranged to operate in compliance with a Joint Electronic Device Engineering Council (JEDEC) specification to include HBM version 2, JESD235C.

9. A method comprising:
receiving, at a near data processor included in a memory controller at a processor, a work request to execute a kernel, an application, or a loop routine using data maintained in a memory region of a first memory device coupled with the near data processor via at least one memory channel;
accessing the data maintained in the memory region to generate values responsive to execution of the kernel, the application, or the loop routine; and
indicating to a requester of the work request that the values have been generated responsive to the work request.

10. The method of claim 9, comprising receiving the work request in a memory buffer of the near data processor, wherein circuitry of the near data processor is arranged to execute the kernel, the application or the loop routine using the data maintained in the memory region of the first memory device.

11. The method of claim 10, the requester of the work request comprising a core of the processor, the core coupled with the memory controller via an on-die interconnect.

12. The method of claim 11, comprising the memory controller at the processor to couple with a second memory controller at the processor via the on-die interconnect, the second memory controller to control access to a second memory device, wherein the near data processor is arranged to serve as an agent on the on-die interconnect to access data maintained in the second memory device through the second memory controller, the circuitry to execute at least a portion of the kernel, the application, or the loop routine using the accessed data maintained in the second memory device.

13. The method of claim 11, the data maintained in the first memory device comprises the data maintained in a memory region of the first memory device shared with the core of the processor, the method further comprising the near data processor:
sending a coherency request to a coherency agent of the core to determine whether the data for use to execute the kernel, the application, or the loop routine is included in a cache for the core;
concurrently sending an access request to the first memory device to access the data maintained in the memory region;
receiving, responsive to the coherency request, an indication that the data is not included in the cache for the core;
receiving, responsive to the access request, the data maintained in the memory region; and
using the data maintained in the memory region to execute the kernel, the application, or the loop routine.

14. The method of claim 11, the data maintained in the first memory device comprises the data maintained in a memory region of the first memory device shared with the core of the processor, the method further comprising the near data processor:
sending a coherency request to a coherency agent of the core to determine whether the data for use to execute the kernel, the application, or the loop routine is included in a cache for the core;
concurrently sending an access request to the first memory device to access the data maintained in the memory region;
receiving, responsive to the coherency request, an indication that the data is included in the cache for the core; and
using the data included in the cache for the core to execute the kernel, the application, or the loop routine.

15. The method of claim 11, comprising the values to be stored to a memory region of the first memory device shared with the core of the processor, the method further comprising the near data processor:
sending a coherency request to a coherency agent of the core to determine whether the coherency agent controls a cache line that includes data from the memory region;
receiving, responsive to the coherency request, an indication that the coherency agent controls a cache line that includes data from the memory region;
sending an indication to the coherency agent that data included in the cache line is invalid; and
causing the values to be stored to the memory region.

16. The method of claim 11, comprising the values to be stored to a memory region of the first memory device shared with the core of the processor, the method further comprising the near data processor:
  sending a coherency request to a coherency agent of the core to determine whether the coherency agent controls a cache line that includes data from the memory region where the values are to be stored;
  concurrently sending an access request to the first memory device to access the data maintained in the memory region that corresponds to the cache line;
  receiving, responsive to the coherency request, an indication that the coherency agent controls a cache line that includes only a portion of the data from the memory region;
  receiving, responsive to the access request, the data maintained in the memory region;
  sending an indication to the coherency agent that the cache line includes invalid data; and
  causing the values to be stored to the memory region.

17. The method of claim 11, the first memory device comprising a high bandwidth memory (HBM) stack resident on a separate chip from the memory controller and the core of the processor, wherein the HBM stack includes dynamic random access memory.

18. A system comprising:
  a first memory device;
  a plurality of cores of a processor; and
  a first memory controller at the processor, the first memory controller to be configured to couple with the plurality of cores via an on-die interconnect, the first memory controller to control access to the first memory device, the first memory controller to include a near data processor, the near data processor to include:
    circuitry to execute a kernel, an application, or a loop routine using data maintained in the first memory device, the data directly accessible to the near data processor via at least one memory channel coupled with the first memory device; and
    a plurality of memory buffers arranged to receive a work request from a core from among the plurality of cores and arranged to indicate that values have been generated by the circuitry responsive to the work request.

19. The system of claim 18, further comprising:
  a second memory device; and
  a second memory controller at the processor, the first memory controller to be configured to couple with the plurality of cores and the first memory controller via the on-die interconnect, the second memory controller to control access to the second memory device, wherein the near data processor is arranged to serve as an agent on the on-die interconnect to access data maintained in the second memory device through the second memory controller, the circuitry to execute at least a portion of the kernel, the application, or the loop routine using the accessed data maintained in the second memory device.

20. The system of claim 18, the data maintained in the first memory device comprises the data maintained in a memory region of the first memory device shared with the core from the plurality of cores, wherein the circuitry is further to:
  send a coherency request to a coherency agent of the core to determine whether the data for use to execute the kernel, the application, or the loop routine is included in a cache for the core;
  concurrently send an access request to the first memory device to access the data maintained in the memory region;
  receive, responsive to the coherency request, an indication that the data is not included in the cache for the core;
  receive, responsive to the access request, the data maintained in the memory region; and
  use the data maintained in the memory region to execute the kernel, the application, or the loop routine.

21. The system of claim 18, comprising the generated values to be stored to a memory region of the first memory device shared with the core from the plurality of cores, wherein the circuitry is further to:
  send a coherency request to a coherency agent of the core to determine whether the coherency agent controls a cache line that includes data from the memory region;
  receive, responsive to the coherency request, an indication that the coherency agent controls a cache line that includes data from the memory region;
  send an indication to the coherency agent that data included in the cache line is invalid; and
  cause the values to be stored to the memory region.

22. The system of claim 18, comprising the generated values to be stored to a memory region of the first memory device shared with the core from the plurality of cores, wherein the circuitry is further to:
  send a coherency request to a coherency agent of the core to determine whether the coherency agent controls a cache line that includes data from the memory region where the generated values are to be stored;
  concurrently send an access request to the first memory device to access the data maintained in the memory region that corresponds to the cache line;
  receive, responsive to the coherency request, an indication that the coherency agent controls a cache line that includes only a portion of the data from the memory region;
  receive, responsive to the access request, the data maintained in the memory region;
  send an indication to the coherency agent that the cache line includes invalid data; and
  cause the values to be stored to the memory region.

23. The system of claim 22, the first memory device comprising a high bandwidth memory (HBM) stack resident on a separate chip from the first memory controller and the plurality of cores of the processor, wherein the HBM stack includes dynamic random access memory.

* * * * *